US010137730B2

(12) United States Patent
Liukas

(10) Patent No.: US 10,137,730 B2
(45) Date of Patent: Nov. 27, 2018

(54) TOOL FOR HANDLING OF A WHEEL

(71) Applicant: Ilkka Liukas, Alastaro (FI)

(72) Inventor: Ilkka Liukas, Alastaro (FI)

( * ) Notice: Subject to any disclaimer, the term of this patent is extended or adjusted under 35 U.S.C. 154(b) by 225 days.

(21) Appl. No.: 15/109,297

(22) PCT Filed: Dec. 22, 2014

(86) PCT No.: PCT/FI2014/051042
§ 371 (c)(1),
(2) Date: Jun. 30, 2016

(87) PCT Pub. No.: WO2015/101707
PCT Pub. Date: Jul. 9, 2015

(65) Prior Publication Data
US 2016/0318339 A1    Nov. 3, 2016

(30) Foreign Application Priority Data

Jan. 3, 2014 (EP) .................................. 14150090

(51) Int. Cl.
*B60B 29/00* (2006.01)
*B60B 31/04* (2006.01)
(Continued)

(52) U.S. Cl.
CPC .......... *B60B 31/04* (2013.01); *B25B 27/0028* (2013.01); *B25B 27/023* (2013.01); *B60B 29/008* (2013.01)

(58) Field of Classification Search
CPC ... B60B 31/04; B60B 29/008; B25B 27/0028; B25B 27/023
See application file for complete search history.

(56) References Cited

U.S. PATENT DOCUMENTS 1,343,661 A * 6/1920 Crim .................... B25B 27/023
29/261
1,465,467 A * 8/1923 Erickson ............... B25B 27/023
29/261
(Continued)

FOREIGN PATENT DOCUMENTS

| CN | 102015427 A | 4/2011 |
| CN | 103507556 A | 1/2014 |
| FR | 2764239 A1 | 12/1998 |

OTHER PUBLICATIONS

International Search Report for Application No. PCT/FI2014/051042, dated Apr. 5, 2015, 2 pages.
(Continued)

*Primary Examiner* — Richard Chang
(74) *Attorney, Agent, or Firm* — Ziegler IP Law Group, LLC

(57) ABSTRACT

The invention is directed to a tool for handling of a wheel, which tool includes a supporting part having a first end and a second end; at least one holder arranged on the supporting part, which holder is arranged to be used in connection with a pushing means; a first compression part having a compression end and a tension end, arranged at the first end of the supporting part pivotally in a plane; a second compression part having a compression end and a tension end, arranged at the second end of the supporting part pivotally in a plane and moving means for moving the first compression part and the second compression part in relation to the supporting part, which means are arranged between the first compression part and the second compression part and into direct connection with the first compression part and the second compression part.

15 Claims, 4 Drawing Sheets

(51) Int. Cl.
  *B25B 27/02*     (2006.01)
  *B25B 27/00*     (2006.01)

(56)         References Cited

U.S. PATENT DOCUMENTS

| | | | |
|---|---|---|---|
| 1,534,350 A | | 4/1925 | Bassett |
| 3,402,455 A | | 9/1968 | Converse |
| 4,852,234 A | * | 8/1989 | Wheeler ............... B25B 27/023 29/261 |
| 4,908,925 A | * | 3/1990 | Johnson ................ B25B 27/023 29/244 |

OTHER PUBLICATIONS

International Preliminary Report on Patentability received for International Application No. PCT/FI2014/051042, dated Jul. 14, 2017, pp. 8.

* cited by examiner

TOOL FOR HANDLING OF A WHEEL

FIELD

The aspects of the disclosed embodiments relate to a tool for handling of a wheel, especially a wheel of a large vehicle or working machine. The aspects of the disclosed embodiments also relate to a method for handling of a wheel as well as to the use of the tool for removing the wheel and for changing the seal of the wheel.

PRIOR ART AND ITS PROBLEMS

Wheels of vehicles and working machines that are equipped with wheels need to be regularly changed due to for example breaking or use of the wheel. Moreover, in large wheels typically a seal is used between the rim and the tyre, and this O-ring may be necessary to change also in between changing the tyre.

Wheels are typically very tightly attached to the hub of the wheel, sometimes even attached by corrosion, thus significant force is needed for removing the wheel. Therefore it is a problem, especially for vehicles and working machines having large wheels, that when the wheel breaks down, the vehicle or working machine needs usually to be hauled to a repair shop for the wheel to be changed. This then causes costs both for the hauling and the time the vehicle or the working machine is out of its duty. In the field there exists thus a need for a simple and reliable tool, with which a wheel can be changed without any other additional equipment, by a single person.

Patent publications disclose several different tools for removing wheels. A common point for all of them is, however, that they are only suitable for such wheels, in which the rims are either equipped with holes into which the removing means can be arranged, or for rims, in which there is a groove-like outer edge that is visible during use.

For example in publication U.S. Pat. No. 1,476,692, there is disclosed means for removing a wheel from a rim and for pulling the wheel out from the axle of the vehicle. In the disclosed means there is a middle part into which three arms have been attached, equipped with hooks at their ends. These hooks are arranged to the groove of the edge of the rim of the wheel and thereafter the threaded shank arranged in the middle part is turned in such a manner that the rim shrinks and the tyre can be removed from the rim. Correspondingly, the threaded shank is turned in such a manner that the rim expands and the wheel can be removed from the axle of the vehicle. Publication U.S. Pat. No. 3,402,455 discloses tyre remover, in which the compression parts are pressed against each other by means of springs arranged between them and the supporting part. Therefore, the compression is not possible to adjust after the tyre remover has been arranged in its place. By the same principle works also the tyre remover, which is disclosed in publication U.S. Pat. No. 1,534,350, in which the compression parts are pressed against each other by means of turnbuckle screws. Furthermore, in both publications the angle of the hooks in the compression ends of the compression parts is 90°, wherein tyre removers are suitable for only a part of tyres, and the pressing force needed is not significant because the compression ends are mechanically stationary.

An aim of the invention is to provide a tool for removing a wheel that is suitable also for wheels with rims having no holes or openings. Furthermore, it is an aim of the invention to provide a tool, with which it is possible to change the seal arranged between the rim and the side ring, without removing the tyre fully from the rim.

In this description, a tyre means a tyre arranged on a rim and mainly manufactured from rubber. The combination of a tyre and a rim is a wheel in this description. The wheel can be a wheel of any vehicle, although the tool according to the invention is especially suitable for handling wheels of large vehicles and working machines. The tool is especially advantageous for removing wheels from vehicles and working machines equipped with wheels such as a lorry, an excavator, a tractor, a bucket charger, a hoist, a crane, an agricultural machine or a harvester.

BRIEF DESCRIPTION

The aspects of the disclosed embodiments relate to a tool for handling of a wheel, which tool comprises a supporting part having a first end and a second end as well as at least one holder arranged on the supporting part, which holder is arranged to be used in connection with a pushing means. Furthermore, a first compression part having a compression end and a tension end is arranged at the first end of the supporting part pivotally in a plane, and a second compression part having a compression end and a tension end is arranged at the second end of the supporting part pivotally in a plane. A typical tool further comprises moving means for moving the first compression part and the second compression part in relation to the supporting part, which means are arranged between the first compression part and the second compression part and into direct connection with the first compression part and the second compression part.

The aspects of the disclosed embodiments also relate to a method for handling of a wheel, by using the above described tool, in which method the compression ends of the first and the second compression parts are arranged inside an edge of a rim and the moving means are used in such a manner that the compression ends of the first and the second compression part move further away from each other.

The aspects of the disclosed embodiments also relate to a use of the tool for removing a wheel from an axle in such a manner, that the compression ends of the first and the second compression parts are arranged inside an edge of a rim; the moving means are used in such a manner that the compression ends of the first and the second compression part move further away from each other; and at least one pushing means is used together with at least one central holder arranged on the supporting part, between its first end and its second end, for pushing the wheel outward from the axle and thereby for removing the wheel from the axle.

The aspects of the disclosed embodiments still further relate to the use of a tool for changing a seal between a rim and a side ring without removing a wheel from an axle, wherein the compression ends of the first and the second compression parts are arranged inside an edge of the rim and the moving means are used in such a manner that the compression ends of the first and the second compression part move further away from each other. Thereafter at least two pushing means are used in connection with at least two end holders arranged on the outer surface of the supporting part, one at its first end and one at its second end, for pushing the side ring towards the axle, for changing the seal arranged between the rim and the side ring.

DETAILED DESCRIPTION

Figure 1:
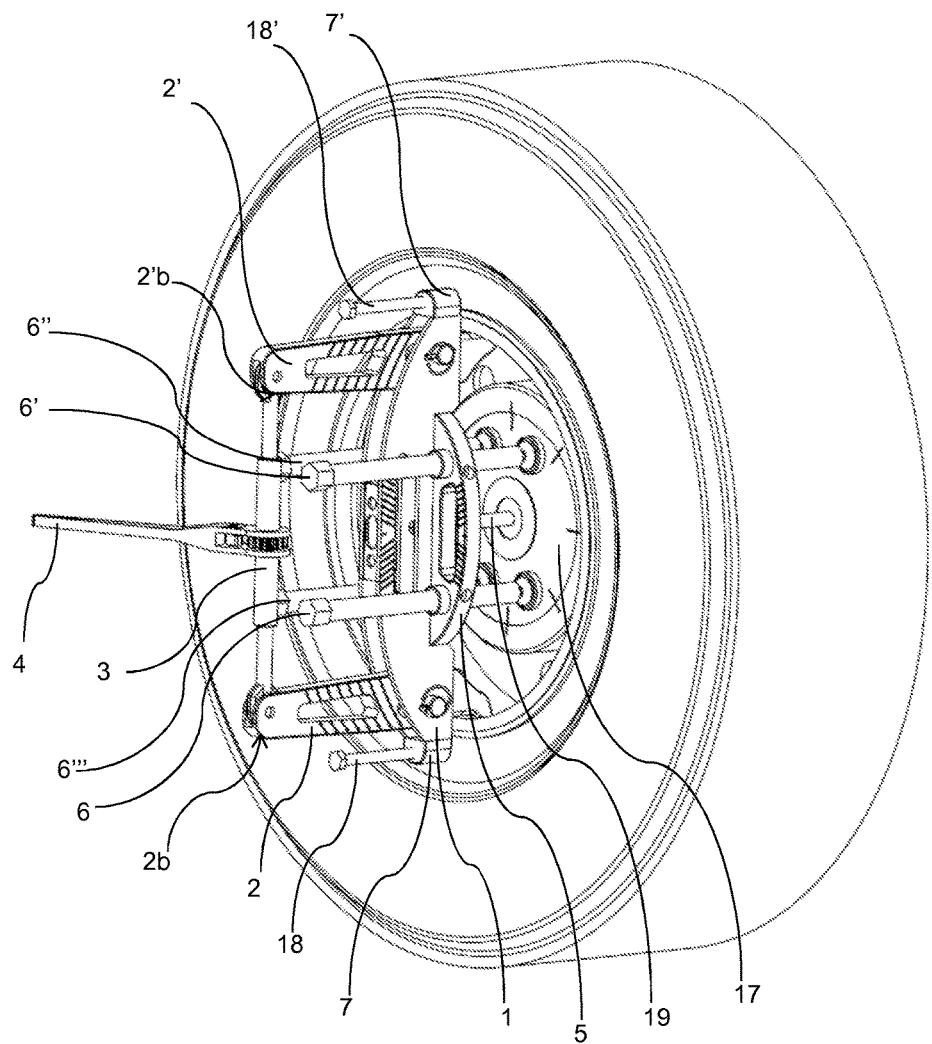
FIG. 1 shows a tool according to an embodiment of the invention as a perspective view.

The aspects of the disclosed embodiments relate to a tool for handling of a wheel, which tool comprises a supporting part having a first end and a second end as well as at least one holder arranged on the supporting part, which holder is arranged to be used in connection with a pushing means. Furthermore, the tool comprises a first compression part having a compression end and a tension end arranged at the first end of the supporting part pivotally in a plane, and a second compression part having a compression end and a tension end arranged at the second end of the supporting part pivotally in a plane. A typical tool further comprises moving means for moving the first compression part and the second compression part in relation to the supporting part, which means are arranged between the first compression part and the second compression part and into direct connection with the first compression part and the second compression part.

The tool according to the one embodiment is thus suitable also for such wheels having rims which do not have any holes or openings, since the compression ends can be arranged inside the edge of the rim and thereby use the inner surface of the rim as a support by wedging the tool inside the rim. Then the tool can be used for removing even large wheels from an axle (i.e. from the hub of the axle) in a reliable and secure manner, without transporting the vehicle or working machine to a repair shop.

Furthermore, with the tool it is possible to change a seal arranged between parts of the rim, that is, between a main part of the rim and a side ring of the rim, without fully removing the tyre from the rim or removing the wheel from the axle, as will be described more in detail below. Also this operation is possible to be done without transporting the vehicle or working machine to a repair shop. Typically the seals need to be replaced more often than the wheels.

The supporting part is typically a longitudinal part, that can be made for example from a sheet. It may also be comprised of two parallel sheet-like components that are arranged in connection with each other, preferably at a distance from each other. Especially preferably this distance is essentially identical to the thickness of the compression part, i.e. the compression parts are arranged between the two components of the supporting part, naturally equipped with a sufficient clearance so that the compression parts can pivot in a plane. In this case both components of the supporting part are typically of the same shape and size.

The compression parts are typically also longitudinal and they are arranged approximately perpendicular to the longitudinal axis of the supporting part. The compression parts are movable with respect to the supporting part, whereby the angle between them varies between about 80° and 100°. If the supporting part and the compression parts are made from a sheet, the planes of their sheet surfaces are essentially parallel, whereby they are easily attachable to each other to pivot in a plane.

A first compression part having a compression end and a tension end is thus arranged at the first end of the supporting part pivotally in a plane, and a second compression part having a compression end and a tension end is arranged at the second end of the supporting part pivotally in a plane. The compression parts are arranged essentially at the ends of the supporting part or in the immediate vicinity of the ends, for example at a distance that is 5-10% of the length of the supporting part. The attachment between the supporting part and the compression parts that pivots in a plane is done in any manner known to a person skilled in the art, such as with a mate pin which forms the pivoting articulation between the supporting part and the compression part. This attachment point forms the articulation point.

The various parts of the tool are typically made of metal, such as steel. Especially the compression parts need to be strong, and they can be made for example from a sheet-like steel, such as a steel sheet with a thickness of 30-50 mm. The supporting part can be made also from a thinner sheet, for example from a steel sheet of a thickness of 5-15 mm. It is to be noted that the tool is especially suitable for the handling of large wheels, thus its parts need to stand also large forces.

The moving means for moving the first compression part and the second compression part with respect to the supporting part can be any means suitable for this purpose. The moving can be for example performed in a hydraulic manner, for example with a jack or jacks. Especially preferably the compression parts move in a symmetrical manner with respect to the virtual symmetry axis of the tool. The virtual symmetry axis of the tool is typically perpendicular to the longitudinal length of the supporting part and essentially parallel to the surface of the largest plane of the supporting part.

According to a preferred embodiment, the moving means is a turnbuckle screw, which is arranged between the tension end of the first compression part and the tension end of the second compression part in such a manner that it is essentially parallel to the supporting part. In this case, the tool preferably comprises also an actuator means for using the turnbuckle screw, for moving the parts of the turnbuckle screw with respect to each other. A turnbuckle screw is a device consisting of two nuts and two screw rods with opposing threads. A turnbuckle screw can be both tightened and loosened, depending on the direction the compression parts need to be moved. The turnbuckle screw can be used with any suitable means, preferably with a ratchet. Preferably the turnbuckle screw is symmetrical and it is used in its middle part, seen in its longitudinal direction.

The moving means are arranged to the compression parts in any suitable manner, either fixedly or removably. Typically the moving means are attached to the compression parts at its ends. According to a preferred embodiment of the invention, the supporting part and the moving means are substantially parallel.

The attachment point of the moving means to the compression parts is chosen depending on the means and their direction of use. The moving means are attached direct to the compression parts, i.e. they are in a direct connection with the compression parts. The moving means can be attached to the compression parts either in the area between the compression end and the articulation point or in the area between the tension end and the articulation point. When the moving means is a hydraulic jack, it is typically attached to the compression parts to the area between the compression end and the articulation point, preferably at a distance from the compression end. When using a turnbuckle screw, it can be attached to the compression parts either at the ends of the compression ends or at their immediate vicinity or alternatively at the area between the tension end and the articulation point, depending on the direction of use of the turnbuckle screw.

According to a preferred embodiment, the compression ends of the first and the second compression parts have been shaped to a hooked form in such a manner that the hook is directed outwards from the virtual axis of symmetry of the tool. By a hook is meant here for example the shape of a wide U. These hooks may have any suitable shape, while taking into account that the shape needs to be suitable for the structure of a typical rim as well as to be sufficiently strong (i.e. the shape shall not comprise parts that are too thin). One alternative shape is shown in the Figures, but a person skilled in the art can easily determine also other suitable shapes. Preferably the hook has a rather sharp end, thereby it finds good support at the inner edge of the rim. The angle α of the hook, which is the angle between the axis of the biggest length of the compression part and the hook, is preferably less than 90°. Especially preferably this angle is 10 to 80°, for example 25 to 45°.

Especially in the rims of the heavy transport equipment have typically not such, in relation to the direction of extraction, surface with 90°, in which the hook of the tool could be placed. If the angle is less than 90° and especially if it is a lot of less than 90°, for example 20° to 30°, the hooks tend to slip when using the tool. Then extraction of a tyre by known ways is not successful. In the present tool has a hook suitable as well as possible for the rim, whereby sufficiently strong compression against the rim is achieved and the extraction of the tyre is successful.

The most preferably angle is the same or a bit bigger angle than it is in the rim in the fastening point of the hook. In practise, the angle of the rim in the fastening point of the hook may slightly vary for example in the rims of different manufacturers, but variations are typically so small that the same tool is suitable at least for the most rims. Often the angle of the hook is a couple of degrees (for example 2 to 15°) bigger than the angle of the rim. Thus the contact occurs as deep from the rim as possible. The angle of the hook may certainly be also smaller than the angle of the rim, but thus the contact between the tool and the rim is just in the edge of the hollow of the rim, whereby the hook could slip a bit during the use.

Thus, the present tool solves the problem of the extraction of the wheel in that case that the rim has not surface to easily grasp. By means of this device the extraction is successful even though the angle of the rim would be as small as 20° to 30°. The smallest angle in which the extraction even theoretically may be successful is 0°.

According to another embodiment, the first compression part is arranged on the supporting part at a distance D from the first end of the supporting part, and the second compression part is arranged on the supporting part at a distance D from the second end of the supporting part, the distance D being chosen between 5 and 50% of the length of the supporting part. Preferably the supporting part is thus arranged between the centre of the length of the compression part and its first end pivotally or rotatably. Thereby, a compression force as large as possible is created.

According to an embodiment, the distance D is selected between 20 and 45% of the length of the supporting part. When the distance is identical on both compression parts, an essentially symmetrical tool and equal distribution of force is obtained.

According to yet another embodiment, the distance D is selected from a value that is between 5, 10, 15, 20, 25, 30, 35, 40, 45 and 10, 15, 20, 25, 30, 35, 40, 45, 50% of the length of the supporting part.

According to an especially preferred embodiment, the attachment of the first and the second compression parts to the supporting part is arranged adjustable. This can be obtained for example by providing the compression part with two or more openings, to which the supporting part is attachable. Then the location of the supporting part with respect to the compression parts is easily adjustable for example according to the size of the wheel to be handled.

The tool is also provided with at least one holder in the supporting part, which holder is arranged to be used with a pushing means. Typically, there has been provided several of these holders, depending on the needs of use of the tool. For example on the outer surface of the supporting part, between its first and second end, at least one central holder can be arranged. Also for example two, one on each side of the supporting part, or respectively four, two on each side of the supporting part, of such central holders can be arranged. The holder can be either an opening fixedly arranged to the supporting part itself, or a separate part can be attached to the supporting part, into which separate part one or more openings has been arranged. Such a separate additional part can be detachable attached to the tool, whereby it can be changed.

Further, it is possible to arrange one central holder on both sides of the supporting part, into one or both of which two openings has been arranged, whereby the holder can be used for the use and guiding of two or more pushing means. It is still possible to arrange only one holder as an additional part of the supporting part, which holder extends to both sides of the supporting part and into which for example four openings have been arranged. Especially preferably the central holder or central holders are arranged, in the longitudinal direction of the supporting part, to its central part, such as for example in its middle or at about a distance of 40% from either or both of its ends (when using more than one holder). There can be also any other number of central holders than one or two, such as for example four, preferably arranged symmetrically with respect to the tool's virtual axis of symmetry. The central holder or central holders can also be arranged between components of the supporting part made of two parallel and essentially identical components.

According to an embodiment the pushing means is a hydraulic jack. Such a hydraulic jack can be arranged to the holder either fixedly or removably, for example via an opening. According to another embodiment, the holder is a holder with internal thread, i.e. an opening with internal thread, and the pushing means is a bolt equipped with an outer thread corresponding to the internal thread. The tool may also comprise both types of pushing means, or some other suitable pushing means. This central holder or these central holders and pushing means arranged to them are used for removing a wheel from an axle. The pushing means can thus be used to direct a force to a hub of the axle, whereby the wheel is removed from the axle. Additionally, a protective plate can be used, which plate can be arranged to protect the hub of the axle when removing the wheel, i.e. between the hub and the ends of the pushing means. Any suitable number of pushing means can be used, depending for example on the size of the tool, such as for example one, two, three, four, five or six. In such a case, there are typically as many openings arranged in the holders as there are pushing means intended to be used.

There are arranged in the tool, optionally in addition to the above-mentioned central holder, at least two end holders, one at its first end and one at its second end. With the pushing means arranged into these end holders, of which there can be also for example four, two at each end, a side ring is pushed towards the axle (i.e. outward from the user), whereby a seal arranged between a rim and the side ring becomes visible, and it can be easily removed and a new seal arranged to replace it. Thereafter the pushing means are moved to the other direction, i.e. backwards, and the side ring moves back over the seal.

The aspects of the disclosed embodiments also relate to a method for handling a wheel, using a tool which comprises a supporting part having a first end and a second end,
at least one holder arranged on the supporting part, which holder is arranged to be used in connection with a pushing means,
a first compression part having a compression end and a tension end, arranged at the supporting part pivotally in a plane,
a second compression part having a compression end and a tension end, arranged at the supporting part pivotally in a plane,
moving means for moving the first compression part and the second compression part in relation to the supporting part, which moving means are arranged between the first compression part and the second compression part and into direct connection with the first compression part and the second compression part, in which method the compression end of the first compression part and the compression end of the second compression part are arranged inside an edge of a rim and the moving means are used in such a manner that the compression end of the first compression part and the compression end of the second compression part move further away from each other.

Thereby the tool directs to the rim a force, which is directed outward from the centre of the rim, and thus by wedging firmly secures the tool to the wheel. When using the tool of the invention the compression ends of the compression parts are first thus arranged inside an edge of a rim and after that using the moving means these compression ends are moved further away from each other.

The wheel can be removed from the axle by using at least one pushing means together with at least one central holder arranged on the outer surface of the supporting part, between its first and second ends. Thereby the wheel is pushed away from the axle with the pushing means and thus removed from the axle. Thus removing a wheel is possible also on the side of a road or on a parking lot. Preferably the hub of the axle is protected with a protective plate before using the pushing means.

The method according to the aspects of the disclosed embodiments can also be used for changing a seal arranged between a rim and a side ring without removing the wheel from an axle and removing the tyre from the rim, in such a manner that at least two pushing means are used in connection with two end holders arranged on the outer surface of the supporting part, at its first and second end, for pushing the side ring towards the axle, whereby the seal is exposed and it can be changed. Also this operation can easily be done for example at a parking lot.

The aspects of the disclosed embodiments thus also relate to the use of a tool according to an embodiment, for changing a seal arranged between a rim and a side ring without removing the wheel from the axle, wherein the compression ends of the first and second compression parts are arranged inside an edge of the rim and the moving means are used in such a manner that the compression ends of the first and the second compression part move further away from each other. Thereafter at least two pushing means are used in connection with at least two end holders arranged on the outer surface of the supporting part, one at its first end and one at its second end, for pushing the side ring towards the axle, for changing the seal arranged between the rim and the side ring.

The aspects of the disclosed embodiments also relate to a use of the tool according to an embodiment for removing a wheel from an axle in such a manner, that the compression ends of the first and the second compression parts are arranged inside an edge of a rim, the moving means are used in such a manner that the compression ends of the first and the second compression part move further away from each other, and at least one pushing means is used together with at least one central holder arranged on the supporting part, between its first end and its second end, for pushing the wheel outward from the axle and thereby for removing the wheel from the axle.

The tool, method and uses according to the aspects of the disclosed embodiments are suitable for the handling of any size of wheels, but are especially suitable for handling of a wheel of a heavy vehicle or a working machine equipped with wheels.

In the above description are described some embodiments of the invention. The features according to the various embodiments can be freely combined, even if it is not expressly mentioned in this description. Similarly the characteristics and features described above or below in connection with the tool are suitable also for the method and uses, even if it is not expressly mentioned. It is furthermore to be noticed that reference numbers are not to be construed as limiting the claims, and the word "comprising" is to be interpreted as an open term.

DETAILED DESCRIPTION OF THE FIGURES

Figure 2:
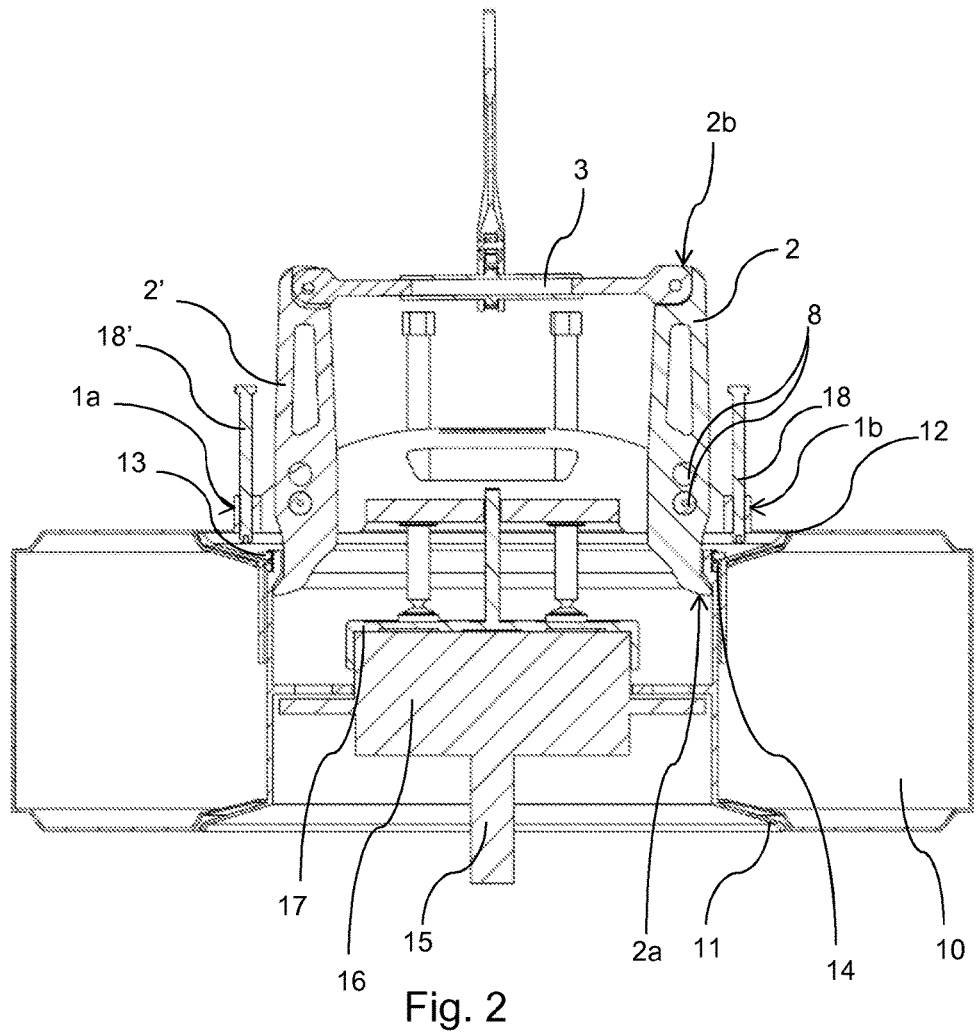
FIG. 2 shows the tool of FIG. 1 as a cross-sectional view.

FIG. 1 shows a tool according to an embodiment. A longitudinal supporting part 1 is shown in the Figure. At the first end 1a (the reference number is shown in FIG. 2) of the supporting part is arranged, pivotally in a plane, a first compression part 2 having a compression end 2a (the reference number is shown in FIG. 2) and a tension end 2b. At the second end 1b (the reference number is shown in FIG. 2) of the supporting part is, also pivotally in a plane, arranged a second compression part 2' having a compression end and a tension end 2'b. Further, the Figure shows a turnbuckle screw 3, which is arranged at its ends between the compression end 2b of the first compression part 2 and the compression end 2'b of the second compression part 2' in such a manner that it is essentially parallel with the supporting part 1. The turnbuckle screw is at both of its end attached to the compression parts. Furthermore the Figure shows a ratchet, i.e. actuator means 4 for using the turnbuckle screw, for moving the parts of the turnbuckle screw with respect to each other.

The Figure also shows three holders 5, 7, and 7' with internal thread arranged on the outer surface of the supporting part 1, of which the holder 5 is a central holder and the holders 7 and 7' are end holders, one at each end of the supporting part. In this embodiment, the central holder 5 extends to the other side of the supporting part, and in total four openings with internal threads have been arranged therein. Similarly are shown bolts 6, 6', 6" and 6''' as well as 18 and 18', arranged to be used in connection with the holders 5, 7 and 7'.

Furthermore, FIG. 1 shows the protective plate 17 of the hub of the axle, which is fixedly arranged to the tool via the pin 19. The protective plate can naturally also be a removable or separate part.

FIG. 2 shows the tool of FIG. 1 as a cross-section. The wheel comprises a tyre 10 and a rim 11. Further is shown a side ring 12, a beadlock 13 and a seal 14, which is an O-ring in this embodiment. Further the Figure shows an axle 15 of a vehicle, a hub 16 of the axle and a protective plate 17 arranged to protect the hub 16 of the axle. The Figure also shows the first end 1*a* and the second end 1*b* of the supporting part 1. There are two openings 8 arranged in the compression part, with the aid of which the position of the compression part relative to the supporting part can be adjusted.

Figure 3:
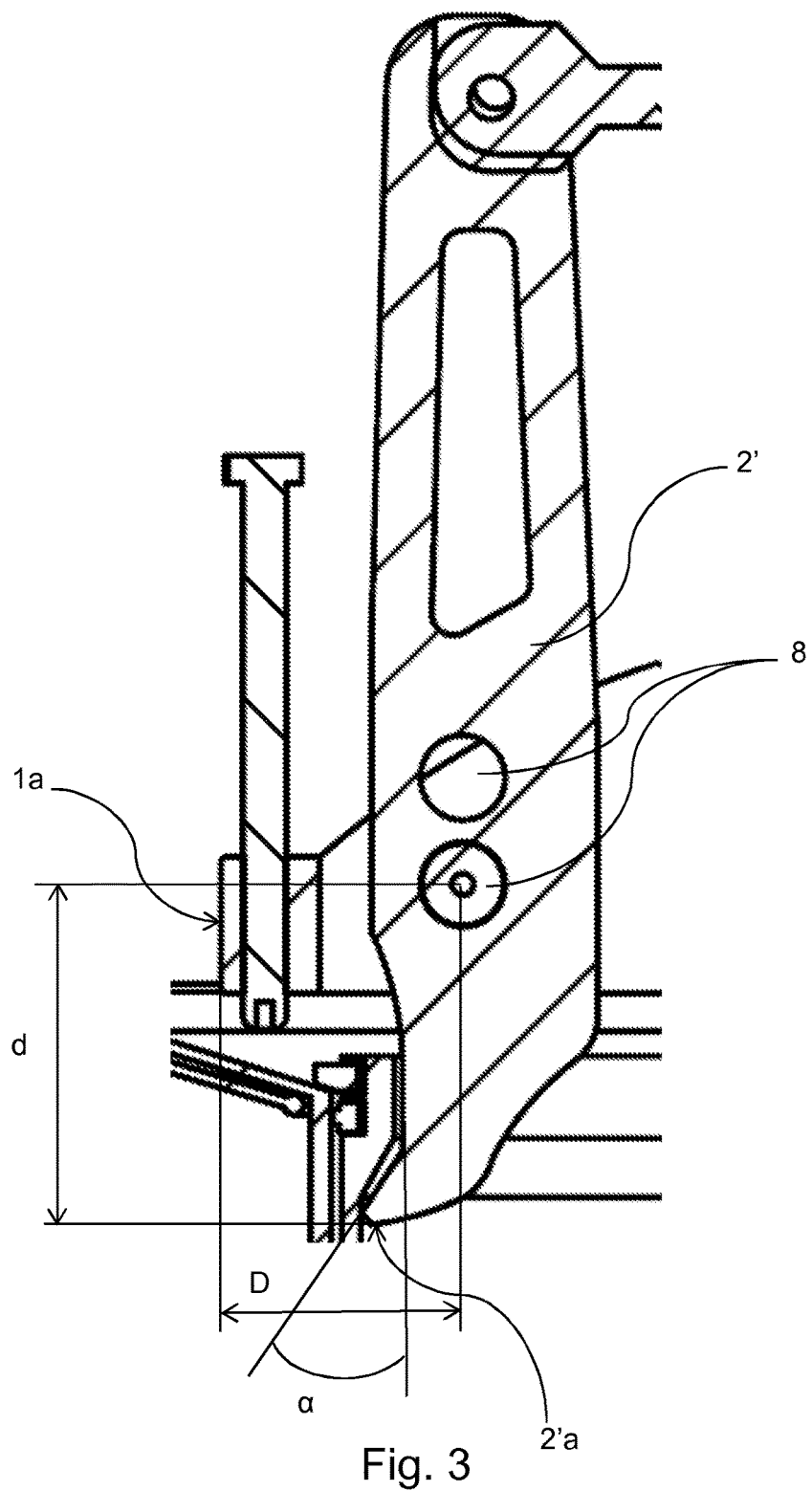
FIG. 3 shows a detail of FIG. 2.
Figure 4:
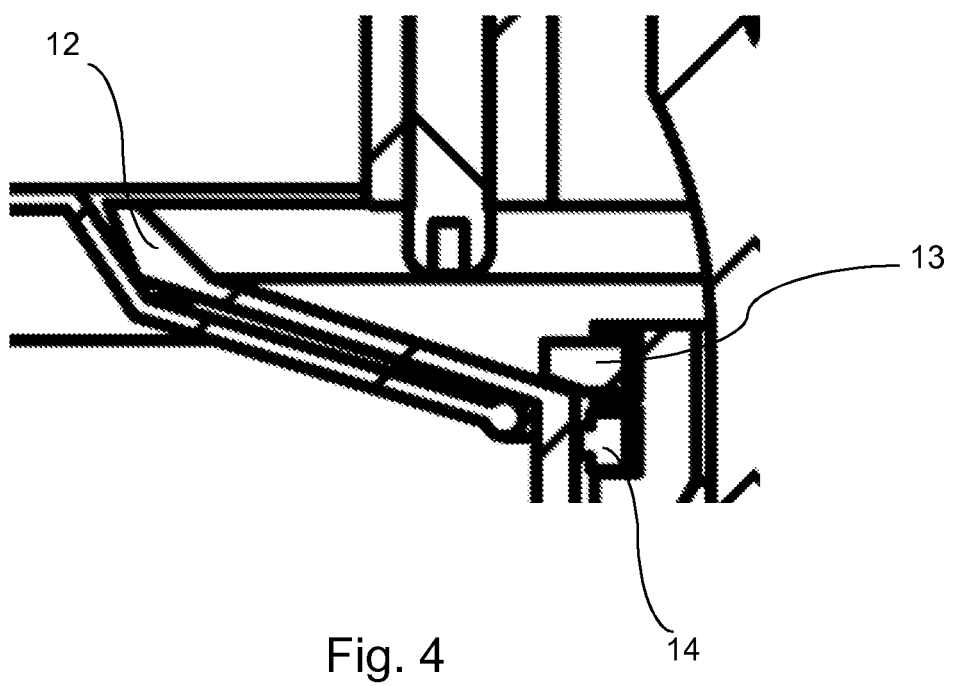
FIG. 4 shows a detail of FIG. 2.

FIG. 3 shows details of FIG. 2. FIG. 3 shows the distance D, which is the distance from the first end 1*a* of the supporting part to the connection point between the supporting part 1 and the compression part 2'. The connection point between the compression part and the supporting part is thus not quite at the end of the supporting part, but at its immediate vicinity. The Figure also shows distance d, i.e. the distance from the compression end 2'*a* of the compression part to the connection point between the compression part and the supporting part. Furthermore, FIG. 3 shows an angle α, which is the angle between the hook and the axis of the longest length of the compression part, in this embodiment about 34°. Such a tool is applicable, for example, for rims, in which a degree of the angle is 22°. FIG. 4 shows the side ring 12 and the seal 14 as well as the beadlock 13 in more detail.

The tool is arranged inside the rim 11 in such a manner that the compression ends of the compression parts 2 and 2' are inside the inner edge of the rim, i.e. the tool is wedged inside the rim. Thereafter the turnbuckle screw is used in such a manner that the compression ends move outward from the centre of the rim and outward from each other (i.e. the turnbuckle screw is used in the Figure upwards and downwards from the plane of the sheet and the compression ends move in the Figure towards right and left). Thereafter bolts 6-6''' are moved towards the axle (downwards in the Figure), whereby, when directed to the hub of the axle and the protective plate 17 arranged to protect it, they push the wheel outwards from the axle.

Correspondingly, if the seal 14 is wished to be changed, the tool is wedged to its place and with the end holders and bolts 18, 18' the side ring 12 is pushed outwards from the tool, whereby the seal 14 is exposed and can be changed.

The invention claimed is:

1. A tool for handling a wheel, the tool comprising:
    a supporting plate member (1) having a first wall member and a second wall member spaced apart from the first wall member, the supporting wall member having a first end (la) and a second end (1*b*),
    at least one threaded holder (5, 7, 7') on the supporting plate member (1), which threaded holder is configured to receive a threaded pushing means (6, 6', 6", 6''', 18, 18'),
    a first compression member (2) having a compression end (2*a*) and a tension end (2*b*), the compression end disposed between the first wall member and the second wall member of the supporting plate member and pivotally connected to the first end of the supporting plate member,
    a second compression member (2') having a compression end (2'*a*) and a tension end (2'*b*), the compression end disposed between the first wall member and the second wall member of the supporting plate member and pivotally connected to the second end of the supporting part,
    moving means (3) having a first end and a second end, the first end connected to the tension end of the first compression member and the second end connected to the tension end of the second compression member, the moving means configured to axially move the first compression member (2) and the second compression member (2') in relation to the supporting plate member, wherein the at least one threaded holder comprises a first end holder (7) connected to the first end of the supporting member and a second end holder (7') connected to the second end of the supporting member.

2. The tool according to claim 1, wherein the at least one threaded holder further comprises at least one central holder (5) disposed on an outer side surface of the supporting plate member, between the first end of the supporting plate member and the second end of the supporting plate member.

3. The tool according to claim 2, wherein two central holders (5) are arranged on the supporting plate member, between the first end and the second end, one central holder on one side of the supporting plate member and another central holder on another side of the supporting plate member.

4. The tool according to claim 1, wherein at least one central holder is arranged on an inside of the supporting plate member, between the first end and the second end.

5. The tool according to claim 1, wherein the pushing means is a hydraulic jack.

6. The tool according to claim 1, wherein the at least one threaded holder is a holder with an internal thread and the threaded pushing means is a bolt.

7. The tool according to claim 1, wherein the moving means (3) is a turnbuckle screw, the turnbuckle screw being connected between the tension end (2*b*) of the first compression part (2) and the tension end (2'*b*) of the second compression part (2'), the turnbuckle screw being disposed on axis that is parallel to an axis of the supporting plate member, and which tool further comprises an actuator connected to the turnbuckle screw and configured to turn the turnbuckle screw and move the first end and the second relative to each other.

8. The tool according to claim 1, wherein the compression ends (2*a*) of the first compression part and the compression end (2'*a*) of the second compression parts is shaped to a hooked form a hook of the hooked form is directed outwards from a virtual axis of symmetry of the tool.

9. The tool according to claim 1, wherein the first compression part is arranged on the supporting plate member at a distance D from the first end of the supporting plate member, and the second compression part is arranged on the supporting plate member at a distance D from the second end of the supporting plate member, the distance D being between 5-50% of a length of the supporting plate member.

10. The tool according to claim 9, wherein the distance D is between 20-45% of the length of the supporting plate member.

11. A The tool according to claim 1, further comprising a protective plate (17) for protecting a hub of an axle, a pin extending from a bottom of the support plate member connecting the protective plate to the tool.

12. A method for handling a wheel, using a tool which comprises:
    a supporting plate member (1) having a first wall member and a second wall member spaced apart from the first wall member, the supporting wall member having a first end (la) and a second end (1*b*),
    at least one threaded holder (5, 7, 7') on the supporting plate member (1), which threaded holder is configured to receive a threaded pushing means (6, 6', 6", 6''', 18, 18'),
    a first compression member (2) having a compression end (2*a*) and a tension end (2*b*), the compression end disposed between the first wall member and the second wall member of the supporting plate member and pivotally connected to the first end of the supporting plate member, a second compression member (2') having a compression end (2'*a*) and a tension end (2'*b*), the compression end disposed between the first wall member and the second wall member of the supporting plate member and pivotally connected to the second end of the supporting part, moving means (3) having a first end and a second end, the first end connected to the tension end of the first compression member and the second end connected to the tension end of the second compression member, the moving means configured to axially move the first compression member (2) and the second compression member (2') in relation to the supporting member, wherein the at least one threaded holder comprises a first end holders (7) connected to the first end of the supporting member and a second end holder (7') connected to the second end of the supporting member, wherein the method comprises:
the compression ends of the first compression part and compression end of the second compression part is disposed against an edge of a rim of the wheel,
the moving means are used in such a manner that the compression end of the first compression part and compression end of the second compression part move further away from each other.

13. The tool according to claim 1, wherein the at least one threaded holder comprises:

a first end holder at a first end of the support plate member;

a second end holder at a second end of the support plate member;

a first pair of central holders on a first side of the support plate member; and a second pair of central holders on a second side of the support plate member, wherein each of the first end holder, second end holder, first pair of central holders and second pair of central holders is configured to receive a respective bolt.

14. The method of using of a tool according to claim 12, wherein the tool is used for removing a wheel from an axle, wherein the method further comprises:

at least one pushing means (6) is used together with at least one central holder (5) arranged on the supporting plate member, between the first end of the supporting plate member and the second end of the supporting plate member to push the wheel outward from the axle and remove the wheel from the axle.

15. The method of using a tool according to claim 12, the tool being used to change a seal between a rim and a side ring of a wheel without removing the wheel from an axle, wherein the method further comprises:

at least two pushing means (18, 18') are used in connection with at least two end holders (7, 7') arranged on the outer surface of the supporting plate member, one at the first end of the supporting plate member and one at the second end of the supporting plate member, wherein the at least two pushing means are configured to push the side ring towards the axle, for changing the seal between the rim and the side ring.

\* \* \* \* \*